(12) United States Patent
Mahmood et al.

(10) Patent No.: US 10,476,619 B2
(45) Date of Patent: Nov. 12, 2019

(54) ROUTING QUALITY-OF-SERVICE TRAFFIC IN A WIRELESS SYSTEM

(75) Inventors: Hamid Mahmood, Kanata (CA); William Gage, Stittsville (CA)

(73) Assignee: Apple Inc., Cupertino, CA (US)

( * ) Notice: Subject to any disclaimer, the term of this patent is extended or adjusted under 35 U.S.C. 154(b) by 4502 days.

(21) Appl. No.: 10/682,088

(22) Filed: Oct. 10, 2003

(65) Prior Publication Data

US 2004/0213198 A1   Oct. 28, 2004

Related U.S. Application Data

(60) Provisional application No. 60/464,844, filed on Apr. 23, 2003.

(51) Int. Cl.
*H04J 3/24* (2006.01)
*H04L 12/28* (2006.01)
*H04L 12/54* (2013.01)

(52) U.S. Cl.
CPC ............. *H04J 3/24* (2013.01); *H04L 12/28* (2013.01); *H04L 12/56* (2013.01)

(58) Field of Classification Search
CPC . H04L 45/00; H04L 47/10; H04L 45/290653; H04L 2012/563; H04L 12/5695; H04L 12/28; H04L 12/56; H04Q 11/0478; H04J 3/24
USPC .......................... 370/389, 392, 395.2, 395.21
See application file for complete search history.

(56) References Cited

U.S. PATENT DOCUMENTS

| | | | | |
|---|---|---|---|---|
| 4,905,233 A | * | 2/1990 | Cain | H04L 45/00 370/237 |
| 5,267,261 A | * | 11/1993 | Blakeney et al. | 370/332 |
| 5,802,056 A | * | 9/1998 | Ferguson et al. | 370/403 |
| 6,108,708 A | * | 8/2000 | Iwata | 709/238 |
| 6,445,918 B1 | * | 9/2002 | Hellander | 455/423 |
| 6,973,053 B1 | * | 12/2005 | Passman et al. | 370/310 |
| 6,977,938 B2 | * | 12/2005 | Alriksson et al. | 370/401 |

(Continued)

FOREIGN PATENT DOCUMENTS

| | | | | |
|---|---|---|---|---|
| GB | 2357665 | 12/1999 | | |
| WO | 0130035 | 10/2000 | | H04L 12/56 |
| WO | WO 02/082108 | * 10/2002 | | G01R 31/28 |

OTHER PUBLICATIONS

IEEE 100: The Authoritative Dictionary of IEEE standards terms, 7th ed., p. 1075.*

(Continued)

*Primary Examiner* — Ronald B Abelson
(74) *Attorney, Agent, or Firm* — Fay Kaplun & Marcin, LLP

(57) ABSTRACT

In a packet-based wireless access network, packet route selection is made in a terminal which communicates with the network via a wireless link. The route selection process uses information provided by the network relating to links in the network, and information available in the terminal relating to its wireless link to the network. Consequently the selected route may be via a wireless link between the terminal and a network node that does not provide the best signal strength but has the best prospect of providing a required Quality-of-Service (QoS) for a traffic flow. Monitoring enables the terminal to update the route selection to maintain the required QoS, despite changing conditions and handover, without a need for signalling messages.

26 Claims, 2 Drawing Sheets

(56) References Cited

U.S. PATENT DOCUMENTS

| | | | |
|---|---|---|---|
| 7,061,896 B2 * | 6/2006 | Jabbari et al. | 370/338 |
| 7,155,215 B1 * | 12/2006 | Miernik et al. | 455/423 |
| 7,161,914 B2 * | 1/2007 | Shoaib et al. | 370/331 |
| 7,206,295 B2 * | 4/2007 | Seguin | 370/328 |
| 7,313,631 B1 * | 12/2007 | Sesmun et al. | 709/245 |
| 2001/0010681 A1 * | 8/2001 | McAllister et al. | 370/228 |
| 2002/0101869 A1 * | 8/2002 | Garcia-Luna-Aceves et al. | 370/389 |
| 2002/0122410 A1 * | 9/2002 | Kulikov | H04L 45/302 370/349 |
| 2002/0173310 A1 * | 11/2002 | Ebata et al. | 455/445 |
| 2002/0191573 A1 * | 12/2002 | Whitehill | H04L 1/0002 370/338 |
| 2003/0021227 A1 * | 1/2003 | Lee | H04L 41/0681 370/228 |
| 2003/0028668 A1 | 2/2003 | Garcia-Luna-Aceves et al. | 709/238 |
| 2003/0091001 A1 * | 5/2003 | Watanabe | H04L 5/1446 370/236 |
| 2003/0174688 A1 * | 9/2003 | Ahmed | H04L 29/12311 370/349 |
| 2003/0185166 A1 * | 10/2003 | Belcea | 370/321 |
| 2003/0193910 A1 * | 10/2003 | Shoaib et al. | 370/331 |
| 2004/0136321 A1 * | 7/2004 | Ren et al. | 370/230 |
| 2004/0219909 A1 * | 11/2004 | Kennedy et al. | 455/422.1 |
| 2005/0047337 A1 * | 3/2005 | Virtanen | 370/229 |
| 2006/0123110 A1 * | 6/2006 | Dolganow et al. | 709/225 |

OTHER PUBLICATIONS

Johnson, Maltz, Dynamic Source Routing in Ad Hoc Wireless Networks, 1996.*

J. Broch, D.B. Johnson, D.A. Maltz, "The Dynamic Source routing Protocol for Mobile Ad Hoc Networks", IETF Manet Working Group, Internet Draft, Mar. 13, 1998, XP002199758 retrieved from the Internet: <URLlwww.monarch.cs.rice.edu/. . . fts/draft-ietf-manet-dsr-00.txt>.

Apostolopoulos, G.; Williams, D.; Kamat, S.; Guerin, R.; Orda, A.; Przygienda, T.; QoS Routing Mechanisms and OSPF Extensions; Networking Group, Request for Comments: 2676; Category: Experimental; Aug. 1999; pp. 1-50.

* cited by examiner

ROUTING QUALITY-OF-SERVICE TRAFFIC IN A WIRELESS SYSTEM

This application claims the benefit of U.S. Provisional Application No. 60/464,844 filed Apr. 23, 2003, the entire contents and disclosure of which are hereby incorporated herein by reference.

CROSS-REFERENCE TO RELATED APPLICATIONS

This patent application is related to the following Provisional patent applications filed in the U.S. Patent and Trademark Office, the disclosures of which are expressly incorporated herein by reference:

U.S. Patent Application Ser. No. 60/446,617 filed on Feb. 11, 2003 and entitled "System for Coordination of Multi Beam Transit Radio Links for a Distributed Wireless Access System" [15741]

U.S. Patent Application Ser. No. 60/446,618 filed on Feb. 11, 2003 and entitled "Rendezvous Coordination of Beamed Transit Radio Links for a Distributed Multi-Hop Wireless Access System" [15743]

U.S. Patent Application Ser. No. 60/446,619 filed on Feb. 12, 2003 and entitled "Distributed Multi-Beam Wireless System Capable of Node Discovery, Rediscovery and Interference Mitigation" [15742]

U.S. Patent Application Ser. No. 60/447,527 filed on Feb. 14, 2003 and entitled "Cylindrical Multibeam Planar Antenna Structure and Method of Fabrication" [15907]

U.S. Patent Application Ser. No. 60/447,643 filed on Feb. 14, 2003 and entitled "An Omni-Directional Antenna" [15908]

U.S. Patent Application Ser. No. 60/447,644 filed on Feb. 14, 2003 and entitled "Antenna Diversity" [15913]

U.S. Patent Application Ser. No. 60/447,645 filed on Feb. 14, 2003 and entitled "Wireless Antennas, Networks, Methods, Software, and Services" [15912]

U.S. Patent Application Ser. No. 60/447,646 filed on Feb. 14, 2003 and entitled "Wireless Communication" [15897]

U.S. Patent Application Ser. No. 60/451,897 filed on Mar. 4, 2003 and entitled "Offsetting Patch Antennas on an Omni-Directional Multi-Facetted Array to allow Space for an Interconnection Board" [15958]

U.S. Patent Application Ser. No. 60/453,011 filed on Mar. 7, 2003 and entitled "Method to Enhance Link Range in a Distributed Multi-hop Wireless Network using Self-Configurable Antenna" [15946]

U.S. Patent Application Ser. No. 60/453,840 filed on Mar. 11, 2003 and entitled "Operation and Control of a High Gain Phased Array Antenna in a Distributed Wireless Network" [15950]

U.S. Patent Application Ser. No. 60/454,715 filed on Mar. 15, 2003 and entitled "Directive Antenna System in a Distributed Wireless Network" [15952]

U.S. Patent Application Ser. No. 60/461,344 filed on Apr. 9, 2003 and entitled "Method of Assessing Indoor-Outdoor Location of Wireless Access Node" [15953]

U.S. Patent Application Ser. No. 60/461,579 filed on Apr. 9, 2003 and entitled "Minimisation of Radio Resource Usage in Multi-Hop Networks with Multiple Routings" [15930]

U.S. Patent Application Ser. No. 60/464,844 filed on Apr. 23, 2003 and entitled "Improving IP QoS though Host-Based Constrained Routing in Mobile Environments" [15807]

U.S. Patent Application Ser. No. 60/467,432 filed on May 2, 2003 and entitled "A Method for Path Discovery and Selection in Ad Hoc Wireless Networks" [15951]

U.S. Patent Application Ser. No. 60/468,456 filed on May 7, 2003 and entitled "A Method for the Self-Selection of Radio Frequency Channels to Reduce Co-Channel and Adjacent Channel Interference in a Wireless Distributed Network" [16101]

U.S. Patent Application Ser. No. 60/480,599 filed on Jun. 20, 2003 and entitled "Channel Selection" [16146]

This invention relates to routing QoS (Quality-of-Service) traffic in a wireless communications system, such as a packet-based wireless access network or mobile wireless access network which can comprise a plurality of distributed nodes among which wireless communications can take place.

BACKGROUND

To facilitate communications in a wireless access network it is desirable to provide a plurality of wireless access and routing points or nodes among which communications can take place via wireless links, the nodes optionally communicating via one or more wired connection paths with a wired communications network, with wireless terminals communicating with the nodes also via wireless links.

In such a wireless access network, for example, the nodes can be distributed within a geographical region or area within which wireless access services are to be provided, and the wireless terminals can communicate with the wired network via the wireless nodes. The wireless terminals, which typically may include mobile terminals, can have any of various forms, and the communicated signals can comprise any desired form of information. For example, the wireless terminals may include modems and/or PCM-CIA cards for personal computers, personal digital assistants (PDAs), mobile or cellular telephones, hybrid combinations of these devices, and so on.

Such a wireless access network conveniently operates in a packet communications mode, in which for example a node is only active (transmitting or receiving radio signals) when it is sending or receiving data packets, and is otherwise in a quiescent state. Typically, packets representing traffic from a wireless terminal are communicated to a proximate wireless access node and are routed through the wireless access network, i.e. via the wireless access nodes, to the wired communications network.

In known packet-based mobile wireless access networks, QoS traffic has been accommodated by creating over a wireless link a "virtual circuit" that is dedicated to a single mobile device or terminal, exchanging signalling messages between the terminal and the network in order for the terminal to reserve resources in the network to meet the QoS traffic needs, and/or adding to each packet information indicating the QoS treatment to be given to the packet.

In each of these cases, all decisions on how to route packets through the wireless network are made independently of the mobile device or terminal. Consequently, routing decisions may not be optimum.

It is desirable to provide an improved method of making routing decisions, and an improved terminal and wireless access network which makes use of such an improved method.

SUMMARY OF THE INVENTION

According to this invention there is provided a method of routing packets from a wireless communications terminal, comprising the steps of, in the terminal: receiving, via a respective wireless link from at least one of a plurality of wireless access nodes forming a network, network information relating to links between the nodes; selecting a route via the network for packets from the terminal in dependence upon the network information and information dependent upon wireless communications between the terminal and at least one of the nodes; and supplying packets with information relating to the selected route. In particular, the links between the nodes can comprise wireless communications links.

The method preferably further comprises the steps of, in the terminal, receiving and monitoring network information to determine a status of the selected route and, selectively in dependence upon the determined status, selecting a new route via the network for packets from the terminal. The step of selecting a new route can comprise selecting a route including wireless communications between the terminal and a different one of the nodes.

The network information can comprise Quality-of-Service parameters such as an available bandwidth, a current delay, and/or an error rate for each link between nodes in at least a part of the network.

The invention also provides a wireless communications terminal arranged for operation in accordance with the method recited above.

The invention also provides a wireless access network comprising a plurality of wireless access nodes, a plurality of links between nodes for packet communications in the network, and at least one wireless communications terminal as recited above for wireless communications with the wireless access nodes, the wireless access nodes being arranged for supplying to the terminal said network information relating to links between the nodes.

Another aspect of the invention provides a method of routing packets from a wireless communications terminal via nodes of a network having wireless communications links between the nodes, comprising the steps of: supplying network information, relating to links between the nodes, from at least one node to the terminal; in the terminal, selecting a route via the network for packets from the terminal in dependence upon the network information and information dependent upon wireless communications between the terminal and at least one of the nodes; in the terminal, supplying packets with information relating to the selected route; and communicating packets from the terminal via the selected route via the nodes of the network in dependence upon the information in the packets relating to the selected route.

Accordingly, in accordance with aspects of the invention information about the current state of the network is provided to the terminal, and the terminal can itself directly make decisions regarding how packets should be routed through the network in order to meet QoS requirements for the packets, and these decisions can be dynamically changed by the terminal during the traffic flow to reflect changing conditions within the network and/or on the wireless link between the terminal and the network. Aspects of the invention can thereby provide an efficient constraint-based route selection which can provide improved routing performance; this is especially advantageous in mobile wireless access networks.

More particularly, aspects of the invention can provide traffic in a packet-based wireless access network with improved QoS, avoiding disadvantages of signalling-based approaches and being responsive to needs of the application providing the traffic and to dynamic changes in the network and on the wireless links between the terminal and the network. In addition, it allows QoS requirements to be maintained for packet flows during and after handover without incurring signalling overhead inherent in known schemes. These are significant advantages especially in networks in which resources are limited, such as networks in which the links between nodes are constituted by wireless links (the invention can also be applied to networks in which links between nodes comprise wired links), and where mobile devices constituting terminals frequently change their points of attachment to the network.

Thus aspects of the invention can take advantage of the fact that a terminal may at any time be within the coverage area of two or more nodes of the network, and hence can make a choice to route packets through any of these nodes or access points depending on factors such as radio signal strength, radio resource availability, and the availability of resources within the network. The terminal can then make intelligent route selection decisions to satisfy the service requirements for each traffic flow, these decisions using information, supplied and updated by the network, concerning constraints (e.g. available bandwidth, average delay, and cost) associated with each link within the network. As the terminal has information concerning each possible "last hop" wireless link between it and the network, it can treat this as another link which provides input in the route selection process.

It will be appreciated that link state routing protocols and some of their standard extensions already provide mechanisms to convey updated link state conditions for the route selection process in the network. However, known route selection processes take place in the nodes of the network, and link state messages are only exchanged between the nodes. The last hop wireless link conditions are not considered in any such route selection, and they are not available to the routing decision engine or process at the network nodes.

Thus in known networks, with routing decisions made only at the network nodes, a terminal does not participate in route selection and instead must use signalling messages over its wireless link to the network to convey QoS requirements for each traffic flow to the network, and the network nodes then invoke a route selection process. This has the disadvantages of signalling overhead not only for providing the QoS requirements initially but also for maintaining established QoS states throughout the packet flow.

Furthermore, in this prior art case the route selection by the network nodes and the access point selection by a mobile terminal are not coordinated. A mobile terminal has no knowledge of conditions in the network, and simply picks an access point that provides the best signal strength, which may be inadequate or undesirable for the required QoS in view of conditions within the network. In other words, the separate routing decisions in the network nodes based on conditions in the network and access point decisions by the terminal based on signal strength may result in a combination that may not satisfy QoS requirements.

In contrast, in embodiments of this invention the terminal is responsible for the route selection. Consequently, conditions (e.g. available bandwidth, current delay, bit error rate, radio signal strength, etc.) of the last hop wireless link between the terminal and the network can be considered in the route selection process. This allows use of alternative access points, and hence alternative routes, that may have a signal strength that may not be the best (while still being enough to provide network connectivity) but have a better prospect of supporting the required QoS of the traffic flow.

In contrast, a route that includes the wireless link having the best signal strength may not provide enough resources, for the last hop or within the network, to support the required QoS.

BRIEF DESCRIPTION OF THE DRAWINGS

The invention will be further understood from the following description by way of example with reference to the accompanying drawings, in which.

DETAILED DESCRIPTION

Figure 1:
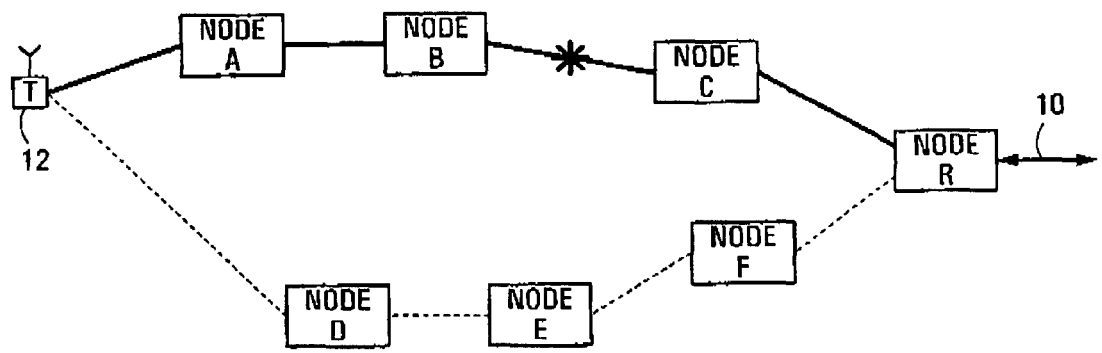
FIG. 1 diagrammatically illustrates a distributed wireless access system with a QoS traffic routing problem addressed in a known manner.

FIG. 1 illustrates a distributed wireless access network or system comprising wireless access nodes which are distributed over a geographic region or service area; by way of example in FIG. 1 seven nodes A to F and R are represented diagrammatically. Wireless communications links between pairs of the nodes are provided in any desired manner, for example using bidirectional radio systems operating in accordance with IEEE Standard 802.11a. In this example the node R is also connected via a wired connection 10 to a wired network (not shown). The wireless access network enables subscribers with suitable terminals, which may have any of various forms and one of which is represented by a mobile wireless terminal 12, to access the wireless network via its nodes and thereby to access the wired network via the node R.

For packet-based wireless communications between the terminal 12 and the wired network via the wireless access network, packets must be routed via the nodes of the wireless network between a node proximate to the terminal 12, for example the node A as shown in FIG. 1, with which the terminal communicates, and the node R connected to the wired network.

As discussed above, such routing in the prior art involves using a virtual circuit, exchanging signalling messages to reserve network resources, and/or indicating information to each packet to determine QoS treatment in the wireless network. In each case the terminal 12 is not involved in the route determination.

More particularly, in the case of a virtual circuit created over the wireless links between nodes of the wireless access network, dedicated to a single mobile device or terminal, the circuit must be defined with characteristics (e.g. bandwidth, delay, etc.) that meet the most stringent Qos traffic requirements of all packets that may be communicated via the circuit, and the corresponding network resources required for the virtual circuit remain dedicated to this single terminal until the virtual circuit is released. As packet-based communications are bursty in nature, and not all packets require the same QoS treatment, such a circuit-based approach results in a significant under-utilization of the network and link resources. This is a particular disadvantage in a wireless access network using limited and relatively costly radio link resources.

In the case of exchanging signalling messages between the terminal and the network to reserve network resources to meet QoS needs, there are several problems or disadvantages:

Firstly, an application in a terminal must be able to predict QoS requirements in advance in order to be able to present these in a signalling message. This is difficult to do, especially if there is interaction between the application and a human user of the terminal. Consequently, QoS requirements may often be requested for a worst-case scenario, resulting in significant under-utilization of network resources as in the circuit-based situation discussed above.

Secondly, there is a need for translation in the wireless network between information provided by an application in such a signalling message and information that the network can use. Often, the application may deal with QoS in abstract terms (e.g. a particular codec), relative terms (e.g. lower cost, more reliability, less delay), or imprecise terms (e.g. "average" bandwidth). In contrast to this, the network needs more concrete information in order to dimension buffers, allocate bandwidth, adjust queue weightings, etc. A translation between the application terms and the network terms can be complex, may be application-specific, and is usually imprecise, resulting in either an approximation of the QoS actually required or an over-provisioning (and hence under-utilization) of network resources to compensate for the translation characteristics.

Thirdly, a mechanism is required to release network resources that are no longer required by the application. For example, a protocol may require signalling messages to be sent by the terminal to refresh the state held by the nodes of the network, resulting in needs for additional signalling bandwidth and additional processing capacity in the nodes of the network.

Furthermore, when a mobile terminal moves to a new attachment point in the wireless access network, e.g. roams or is handed over to a different node, the nodes of the wireless access network along a new packet forwarding (i.e. routing) path may be different from those along the original packet forwarding path. In this case the nodes along the new path may not be aware of resource requirements that were signalled by the terminal to its original attachment point, so that additional signalling messages are required to allocate resources in the nodes of the new path. Further, there is no guarantee that the required resources will be available along this new path, because handover decisions are often made independently of any QoS decisions.

In the case of adding information to each packet to indicate the QoS treatment to be given to the packet, the overhead of signalling messages as described above is avoided, but the network nodes have no advance information as to QoS requirements before a packet arrives, and the network must provide QoS treatment on a packet-by-packet basis because it has no other information available to it. Hybrid proposals have also been made to reserve resources for aggregated traffic classes, providing better utilization of reserved resources but with less stringent guarantees on the resulting QoS.

All of these cases applied to wireless networks, and routing in wired networks, are focussed on a QoS route selection process in the network, without taking into account the state of the "last hop" wireless link between the terminal and the proximate node with which it communicates. However, in a wireless network this last hop wireless link can have a significant or greatest impact on resource offering for a QoS traffic request.

In particular, in accordance with the present invention it is recognised that, where different nodes of a wireless access network provide overlapping coverage for a terminal, the terminal may have a choice of node to which it will attach or handover. As only the terminal has accurate information as to the conditions for each of the potential wireless links which may be used, its input into the selection of an optimum route for forwarding packets becomes critical for meeting QoS requirements.

For example, referring to FIG. 1, the terminal 12 is illustrated as communicating with the node A of the network (the communications between the terminal 12 and the node A being the last hop as discussed above), which in accordance with a known routing process as described above establishes a packet forwarding route via the nodes B and C to the node R and thence to the wired network via the connection 10, without any consideration of conditions on the last hop wireless link. The resulting packet forwarding route in the wireless network is shown by bold lines as being from the terminal 12 via the nodes A, B, and C to the node R. This route is selected, typically by the node A, despite, for example, traffic congestion which may exist between the nodes B and C as shown by an asterisk on the link between these nodes, and the possibility of a better overall alternative route via nodes D, E, and F as shown by dashed lines in FIG. 1.

Figure 2:
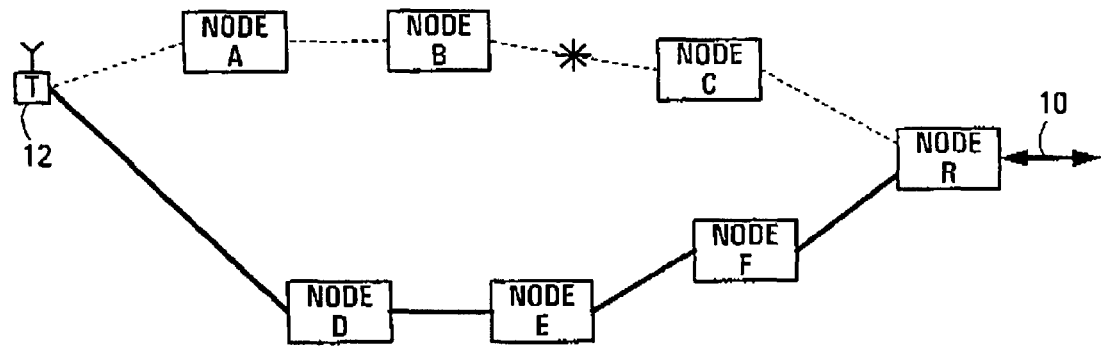
FIG. 2 diagrammatically illustrates a distributed wireless access system with a similar QoS traffic routing problem addressed in a manner in accordance with an embodiment of the invention.

FIG. 2 illustrates selection of this better overall alternative route in the manner described below in accordance with an embodiment of the invention. Thus in FIG. 2 the selected route shown by bold lines is from the terminal 12 via the nodes D, E, and F to the node R and thence to the wired connection 10, and the route via the nodes A, B, and C, including the congested link between the nodes B and C, is not selected as shown by dashed lines.

The route selection of FIG. 2 is performed in the terminal 12 rather than in the network of nodes A to F and R. This enables the alternative last hop link between the terminal 12 and the node D to be taken into account, and enables the better alternative route to be selected as shown in FIG. 2, whereas this is not possible or not practical in the route selection performed by the node A in the case of FIG. 1.

In order to perform the route selection in the terminal 12, this terminal (and correspondingly each other terminal performing a route selection) acts as a router to build a routing information database and a topology snapshot of the wireless access network from link state messages that are supplied to the terminal 12, and are updated, by the nodes within the coverage area of which the terminal 12 is located (the nodes A and D in FIGS. 1 and 2), these messages being processed accordingly in the terminal 12, as described further below.

It is noted in this respect that the wireless access network may be a relatively small network having a simple topology, or it may be a relatively large network which may have an aggregated topology. In an aggregated topology, the network is considered to comprise a plurality of domains, and the link state messages supplied to the terminal 12 can represent information for the respective domain rather than for the entire wireless access network, in order to limit corresponding resources (e.g. for storage and processing) required in the terminal 12. For simplicity, the following description refers to the network, but it can be appreciated that the same description can also apply to the domains of an aggregated network.

Although as described above, and illustrated in FIGS. 1 and 2, conditions between the nodes B and C affect the source routing by the terminal 12, the route selection by the terminal 12 can take into account arbitrary conditions within the network and on the last hop wireless links between the terminal and nodes of the network. For example, channel conditions or resources for the last hop wireless link between the terminal 12 and the node A may be such that a required QoS may not be achievable via this link even though it provides the best signal strength. Conversely, the wireless link between the terminal 12 and the node D may have a lower, but still sufficient, signal strength, and this link may be able to provide the required QoS. In this case the terminal 12 can select the latter as its last hop wireless link for forwarding packets with the required QoS, as described above with reference to FIG. 2, because it determines the packet routing.

Figure 3:
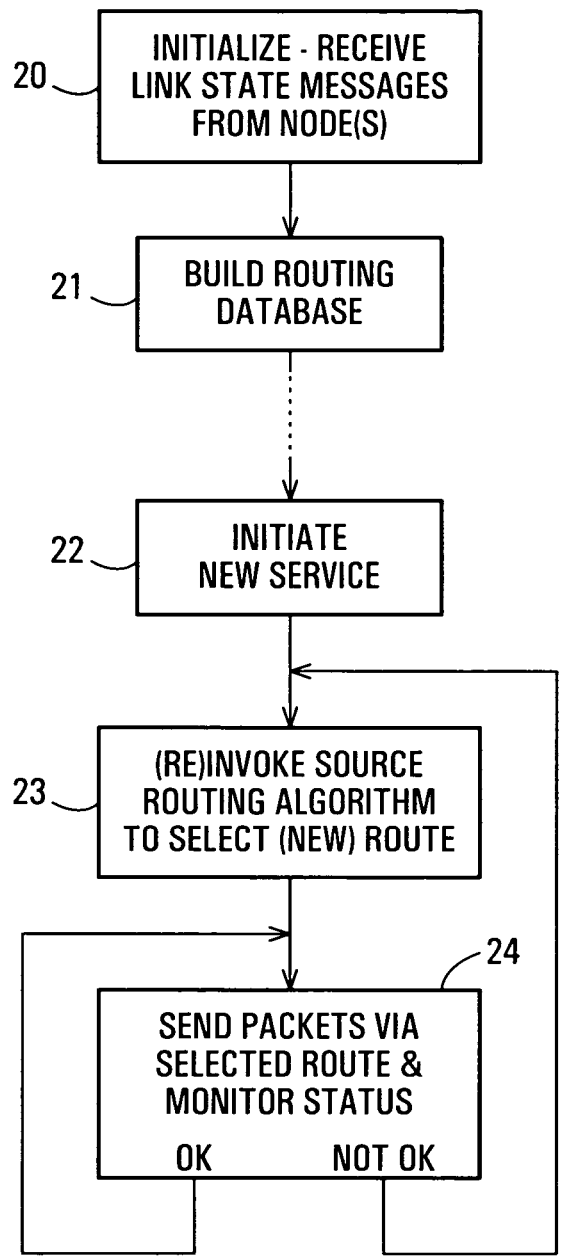
FIG. 3 shows a flow chart illustrating steps in accordance with an embodiment of the invention.

Referring to the flow chart in FIG. 3, as shown by a block 20, on initialization of the mobile device or terminal 12 access points or nodes of the wireless access network that detect the presence of the terminal 12 provide link state messages to the terminal 12. These link state messages contain QoS parameters such as available bandwidth, delay, and cost for each link between nodes in the wireless access network (or in the relevant domain of an aggregated network). To enable the inclusion of such link state messages, extensions to known IP routing protocols have been standardized—see Apostolopoulos et al., "QoS Routing Mechanisms and OSPF Extensions", Internet Engineering Task Force (IETF) document RFC 2676, August 1999. Accordingly, the terminal 12 can simply request the link state message information by appropriate signalling to the nodes, each of which maintains this information as part of its operation in the wireless access network.

As shown by a block 21 in FIG. 3, the terminal 12, acting as a router, then processes the link state message information to build its routing information database and a topology snapshot of the network (or the relevant domain). It will be appreciated that, although not shown in FIG. 3, the terminal 12 can maintain this information over time in a similar manner from updated link state messages, to reflect changes that may take place in the wireless access network or in the location of the terminal.

Subsequently, as shown by a block 22 in FIG. 3, a new service may be initiated or requested from the terminal 12, for example by a human user of the terminal.

As shown by a block 23 in FIG. 3, the terminal 12, knowing the QoS requirements for the requested service, invokes a source routing algorithm in the terminal 12 to compute and select a route for packets for this service, in accordance with the QoS requirements, via one of the nodes or access points that have provided the terminal with the link state messages or updates. As disclosed by Apostolopoulos et al. as referred to above, extensions are available for base routing algorithms, such as Dijkstra and Bellman-Ford algorithms, that can perform route computation based on QoS link state parameters rather than just simple cost. The terminal 12 desirably enhances its route selection process by including wireless link parameters, such as signal strength, bit error rate, etc., in the route computation algorithm to provide a more accurate view of QoS along the available paths, for example the last hop paths between the terminal 12 and the nodes A and D in FIGS. 1 and 2.

It should be noted that this route computation takes place only in the terminal 12, which accordingly can take into account information relating to the alternative last hops as well as information from its routing information database related to the links between the nodes of the wireless access network to provide an optimum route selection for forwarding packets in accordance with the required QoS, as distinct from route selection being performed in a node as in the prior art. It can be appreciated that this also enables a terminal 12 providing such route selection to be deployed in an existing wireless access network, without requiring any change to the nodes of such a network.

As shown by a block 24 in FIG. 3, the terminal 12 then forwards packets of the QoS traffic along the selected route using a source routing mechanism. The route that each forwarded packet is to follow is explicitly defined in the packet, to make sure that the packet traverses the path that the terminal 12 has computed and selected (for example, the path via the nodes D, E, and F in FIG. 2).

At the same time and continually throughout an active session during which packets are forwarded, the terminal 12 monitors the status of the selected route via link state update messages from the network nodes. As shown in FIG. 3, if the monitored status is OK, the terminal 12 loops through the block 24 to continue forwarding packets of the QoS traffic via the selected route.

As also shown by the block 24 in FIG. 3, the monitored status may become not OK, for example in the event that the selected route can no longer support the QoS requirements of the traffic flow (e.g. due to network dynamics), or in the event that threshold values provided to trigger route re-computation are crossed. In this case, as shown in FIG. 3, a return is made by the terminal 12 to the block 23 and the source routing algorithm is re-invoked to compute and select a new route using updated link state information, and this new route is subsequently used for forwarding packets in the same manner as described above. It can be appreciated that the steps of triggering the recomputing and selecting this new route are performed autonomously in the terminal 12, and that this does not require any co-ordination with nodes of the wireless access network.

A similar return to the block 23 to re-invoke the source routing algorithm and select a new route can be carried out at any time during an active session if this is determined by the terminal 12 to be desirable. For example, if the terminal 12 determines that current conditions on the last hop wireless link are not favourable for continuing to support the QoS of the active data sessions or services, e.g. there is a low signal strength, increased error rate, or current network conditions via the prevailing last hop are adverse, it may re-invoke the source routing algorithm to determine a better path via another node with which the terminal 12 can communicate.

On execution of a handover to a new node or access point, a routing update is conveyed from the terminal to the wireless access network nodes to update routing tables with the current location of the terminal 12 (i.e. the identity of the node with which the terminal 12 is now associated), using known mechanisms.

It can be appreciated that the source routing as described above of packets from the terminal 12 via the wireless access network does not involve signalling messages as discussed above, can provide an optimum route selection which takes into account the state of the last hop wireless link between the terminal and the network as well as the link states of the network, and can avoid over-provisioning and under-utilization of network resources. Furthermore, this route selection can be easily updated with changing conditions for the last hop and/or in the wireless access network.

As discussed above, the terminal 12 (and other terminals similarly provided throughout the region covered by the wireless access network) can be of any desired form, such as a mobile telephone, or a PCM-CIA card, modem, etc. for providing wireless communications for an associated item such as a computer, PDA, or hybrid device having processing, storage, and communication circuits known in the art for carrying out the various functions required and/or discussed above.

The invention is applicable to arbitrary wireless networks, including IEEE 802-compliant networks such as IEEE 802.11(a) and (b) and 802.16 wireless networks, and to arbitrary air interface standards, including those promulgated by 3GPP, 3GPP2, ETSI, TIA, etc., and to different forms of multiplexing including time division, frequency division, orthogonal frequency division, and code division multiplexing. Thus the invention is not limited to any particular type of wireless system, and can be applied to any wireless system in which route selection may be desired.

Thus although particular embodiments of the invention are described above, it can be appreciated that these are given only by way of example and illustration, and that numerous modifications, variations, and adaptations may be made within the scope of the invention as defined in the claims.

The invention claimed is:

1. A method of routing packets from a wireless communications terminal, comprising the steps of, in the terminal:
   receiving, via a respective wireless link from at least one of a plurality of wireless access nodes forming a network, network information relating to links between the nodes;
   selecting a multi-node route via the network for packets from the terminal in dependence upon the network information and information dependent upon wireless communications between the terminal and at least one of the nodes;
   supplying packets with route information relating to the selected multi-node route, wherein the route information defines each of the nodes along the selected multi-node route; and
   receiving and monitoring network information to determine a status of the selected multi-node route and, selectively in dependence upon the determined status indicating that a value of at least one parameter of the network information has crossed a route re-computation threshold, selecting a new multi-node route via the network for packets from the terminal, wherein the selecting the new multi-node route is performed at a time when the selected multi-node route is available to route packets from the terminal to the network and wherein the selecting the new multi-node route is performed autonomously in the terminal without any co-ordination with the nodes of the network.

2. A method as claimed in claim 1 and further comprising the step of, in the terminal, monitoring a status of the selected multi-node route.

3. A method as claimed in claim 1 wherein the step of selecting a new multi-node route comprises selecting a multi-node route including wireless communications between the terminal and at least one different node.

4. A method as claimed in claim 3 wherein the links between the nodes comprise wireless communications links.

5. A method as claimed in claim 1 wherein the links between the nodes comprise wireless communications links.

6. A method as claimed in claim 5 wherein said network information comprises Quality-of-Service parameters.

7. A method as claimed in claim 5 wherein said network information comprises an available bandwidth for each link between nodes in at least a part of the network.

8. A method as claimed in claim 5 wherein said network information comprises a current delay for each link between nodes in at least a part of the network.

9. A method as claimed in claim 5 wherein said network information comprises an error rate for each link between nodes in at least a part of the network.

10. A wireless communications terminal arranged for operation in accordance with the method of claim 1.

11. A wireless communications terminal arranged for operation in accordance with the method of claim 3.

12. A wireless access network comprising a plurality of wireless access nodes, a plurality of links between nodes for packet communications in the network, and at least one wireless communications terminal as claimed in claim 11 for wireless communications with the wireless access nodes, the wireless access nodes being arranged for supplying to the terminal said network information relating to links between the nodes.

13. The method of claim 1, wherein the value of the one parameter crossing the route re-computation threshold comprises an increased error rate of an active data session on a single hop of the selected multi-node route.

14. A method of routing packets from a wireless communications terminal via nodes of a network having wireless communications links between the nodes, comprising the steps of:
supplying network information, relating to links between the nodes, from at least one node to the terminal;
in the terminal, selecting a multi-node route via the network for packets from the terminal in dependence upon the network information and information dependent upon wireless communications between the terminal and at least one of the nodes;
in the terminal, supplying packets with route information relating to the selected multi-node route, wherein the route information defines each of the nodes along the selected multi-node route;
communicating packets from the terminal via the selected multi-node route via the nodes of the network in dependence upon the information in the packets relating to the selected multi-node route; and
in the terminal, monitoring network information to determine a status of the selected multi-node route and, selectively in dependence upon the determined status indicating that a value of at least one parameter of the network information has crossed a route re-computation threshold, selecting a new multi-node route via the network for packets from the terminal, wherein the selecting the new multi-node route is performed at a time when the selected multi-node route is available to route packets from the terminal to the network and wherein the selecting the new multi-node route is performed autonomously in the terminal without any co-ordination with the nodes of the network.

15. A method as claimed in claim 14 wherein the step of selecting a new multi-node route comprises selecting a multi-node route including wireless communications between the terminal and at least one different node.

16. A method as claimed in claim 14 wherein said network information comprises Quality-of-Service parameters.

17. A method as claimed in claim 14 wherein said network information comprises an available bandwidth for each link between nodes in at least a part of the network.

18. A method as claimed in claim 14 wherein said network information comprises a current delay for each link between nodes in at least a part of the network.

19. A method as claimed in claim 14 wherein said network information comprises an error rate for each link between nodes in at least a part of the network.

20. A method as claimed in claim 1 wherein the step of selecting a multi-node route via the network for packets from the terminal is also dependent upon at least one Quality-of-Service parameter for said packets.

21. A wireless communications terminal arranged for operation in accordance with the method of claim 20.

22. A method as claimed in claim 14 wherein the step of selecting a multi-node route via the network for packets from the terminal is also dependent upon at least one Quality-of-Service parameter for said packets.

23. A method of routing packets from a wireless communications terminal, comprising the steps of, in the terminal:
receiving, via a respective wireless link from at least one of a plurality of wireless access nodes forming a network, network information relating to links between the nodes;
selecting a multi-node route via the network for packets from the terminal in dependence upon at least one Quality-of-Service parameter for said packets, the network information, and information dependent upon wireless communications between the terminal and at least one of the nodes;
supplying packets with route information relating to the selected multi-node route, wherein the route information defines each of the nodes along the selected multi-node route; and
receiving and monitoring network information to determine a status of the selected multi-node route and, selectively in dependence upon the determined status indicating that a value of at least one parameter of the network information has crossed a route re-computation threshold, selecting a new multi-node route via the network for packets from the terminal, wherein the selecting the new multi-node route is performed at a time when the selected multi-node route is available to route packets from the terminal to the network and wherein the selecting the new multi-node route is performed autonomously in the terminal without any co-ordination with the nodes of the network.

24. A wireless communications terminal arranged for operation in accordance with the method of claim 23.

25. A wireless access network comprising a plurality of wireless access nodes, a plurality of links between nodes for packet communications in the network, and at least one wireless communications terminal as claimed in claim 24 for wireless communications with the wireless access nodes, the wireless access nodes being arranged for supplying to the terminal said network information relating to links between the nodes.

26. A method of routing packets from a wireless communications terminal via nodes of a network having wireless communications links between the nodes, comprising the steps of:
supplying network information, relating to links between the nodes, from at least one node to the terminal;
in the terminal, selecting a multi-node route via the network for packets from the terminal in dependence upon at least one Quality-of-Service parameter for said packets, the network information, and information dependent upon wireless communications between the terminal and at least one of the nodes;

in the terminal, supplying packets with route information relating to the selected multi-node route, wherein the route information defines each of the nodes along the selected multi-node route;

communicating packets from the terminal via the selected multi-node route via the nodes of the network in dependence the information in the packets relating to the selected multi-node route; and in the terminal, receiving and monitoring network information to determine a status of the selected multi-node route and, selectively in dependence upon the determined status indicating that a value of at least one parameter of the network information has crossed a route re-computation threshold, selecting a new multi-node route via the network for packets from the terminal, wherein the selecting the new multi-node route is performed at a time when the selected multi-node route is available to route packets from the terminal to the network and wherein the selecting the new multi-node route is performed autonomously in the terminal without any co-ordination with the nodes of the network.

* * * * *